Aug. 25, 1959     M. WATTER ET AL     2,901,590
METHOD OF FABRICATING SANDWICH TYPE PANELS
Filed June 19, 1957     2 Sheets-Sheet 1
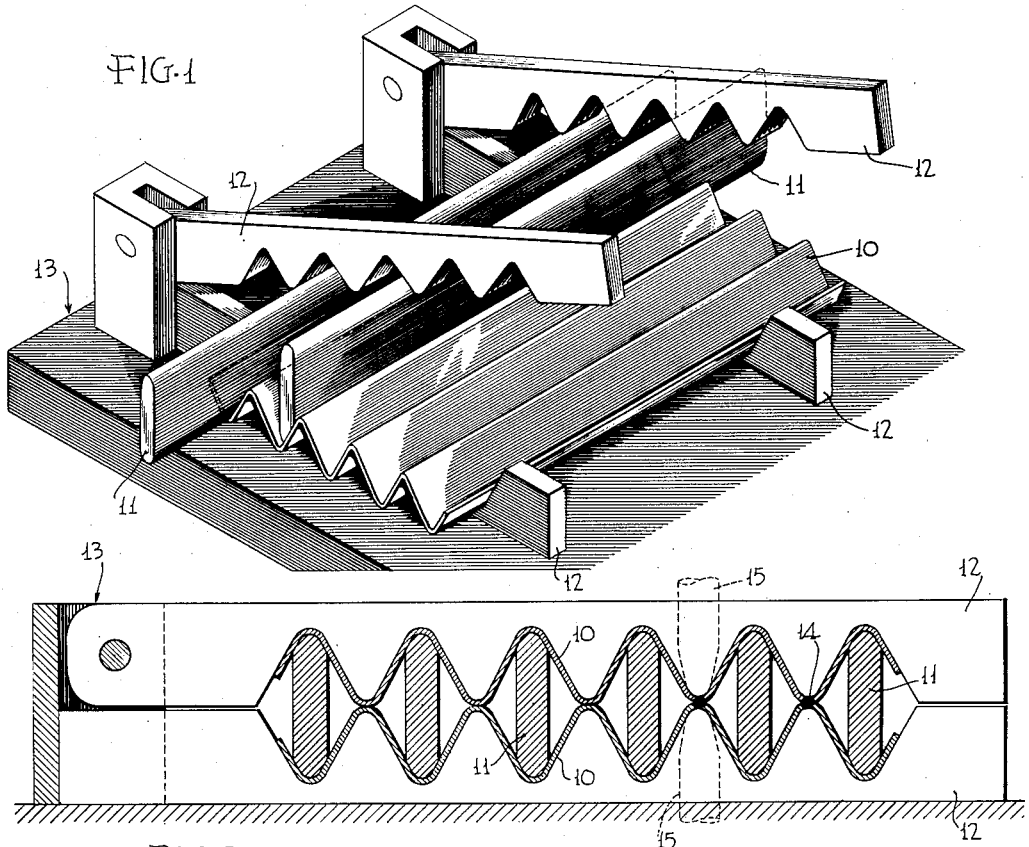
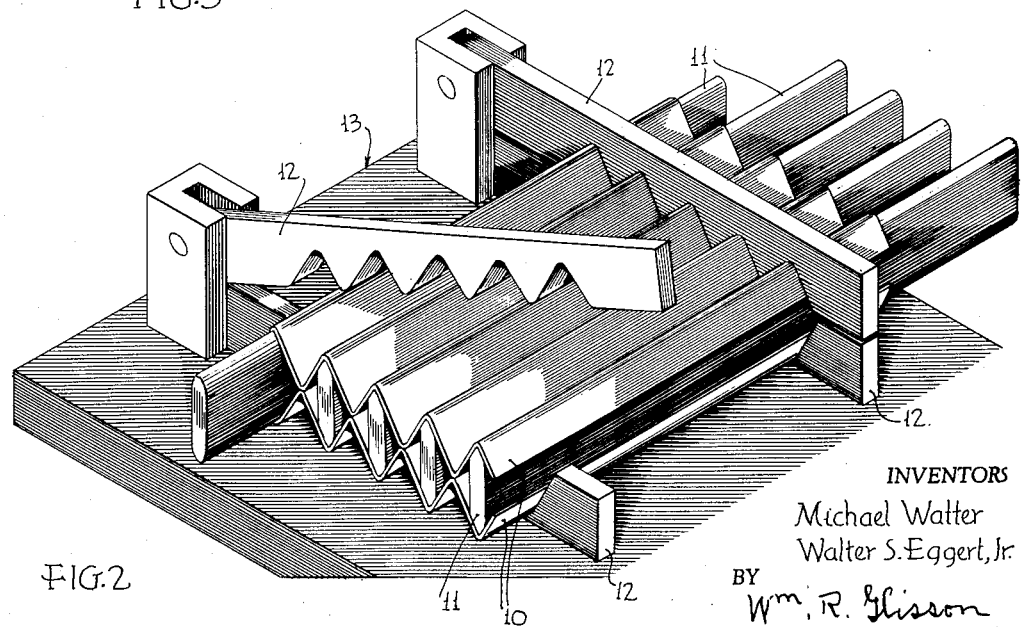
INVENTORS
Michael Watter
Walter S. Eggert, Jr.
BY
Wm. R. Glisson
ATTORNEY

2,901,590

METHOD OF FABRICATING SANDWICH TYPE PANELS

Michael Watter and Walter S. Eggert, Jr., Philadelphia, Pa., assignors to The Budd Company, Philadelphia, Pa., a corporation of Pennsylvania Application June 19, 1957, Serial No. 667,064

2 Claims. (Cl. 219—117)

This invention relates to a method of fabricating sandwich type panels, particularly to the method of fabricating sandwich type panels of single or double curvature, as for aircraft airfoils and the like, and has for an object the provision of improvements in this art.

The problems related to the fabrication of sandwich type curved panels, particularly by resistance welding connections in sheet metal, wherein a panel consists of one or more outer curved skins and one or more interior core elements, include these important phases:

(1) Dimensional control of the core configuration while welding it together,
(2) Contouring or shaping the core,
(3) Final welding of the outer skin to the core.

To explain further, there may be considered three typical forms of core configuration which are particularly suitable for high performance structures of great load capacity, high skin heat resistance and light weight. A fundamental characteristic of all these types is that the core has a series of generally parallel passages adapted to receive mandrels. Two of these core types can be made efficiently on a hand or power brake, or by employing rollers in series, either driven or idle. The third is a stamped core design. Stainless steel is a type of metal used in forming the structures.

The core unit may be simple, consisting of a single element such as a corrugated sheet, or it may be compound, consisting of a plurality of elements welded together. Some of the advantages of the invention are realized with the simple type but more are realized with the compound type and that has been selected for illustration herein.

One of the particular objects of the invention is to provide a method of fabricating sandwich type panels which are accurate in shape.

Another object is to provide panels which have sound welds throughout.

Another object is to provide a method which is simple, convenient and inexpensive.

The above and other objects and various advantages of the invention will be apparent from the following description of an exemplary embodiment, reference being made to the accompanying drawings, wherein:

Fig. 1 is a perspective view of a welding jig with one core element and a couple of mandrels placed therein;

Fig. 2 is a view similar to Fig. 1 showing the full core and mandrel assembly in the jig;

Fig. 3 is a transverse vertical section through the core assembly in the jig, showing the start of welding operations;

Fig. 6 is a transverse end view showing how the assembly is kept rigid by the mandrels while an attachment is welded on.

Figure 4:
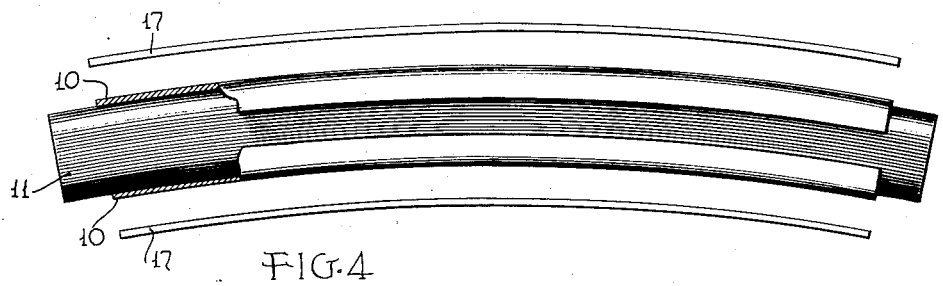
Fig. 4 is a view after bending the core on the mandrels and with two pre-formed skin sheets ready for assembly with the core.

The core elements 10 are shown as simple corrugated members which can be made from flat sheet stock by a brake or the like. Other types, such as sheets with spaced dimples in cross rows and the like may also be assembled by this method. As shown in Figs. 1 to 3, the core elements are assembled together with mandrels 11 between them and are clamped in accurately spaced position by notched rack bars 12 forming part of a jig fixture 13. Although not shown, the free ends of the bars are usually secured together in final assembly to hold them fast.

The core elements are then welded together in the valleys, as shown at 14, by electrodes 15, here shown in dotted outlines. Only a limited length and width of material is here shown but it is to be understood that panels of quite extensive size may be made by this method.

After the core assembly has been fully welded together, and with the mandrels still in place, the unit is bent in a single curvature by any suitable means to take the shape shown in Fig. 4. The core elements are stretched to shape without buckling because of the presence of the mandrels. The mandrels may be formed of a material which can be bent fairly easily and which has good electrical conductivity but which is rigid enough during welding to resist the pressure of the electrodes. Copper is one material which has been found to be suitable.

The skin sheets 17, Fig. 4, are pre-formed to shape, as in a press, by peening, or otherwise, in known manner. If they have double curvature, as shown in Fig. 5, the core assembly may be readily bent in the other direction to conform.

Figure 5:
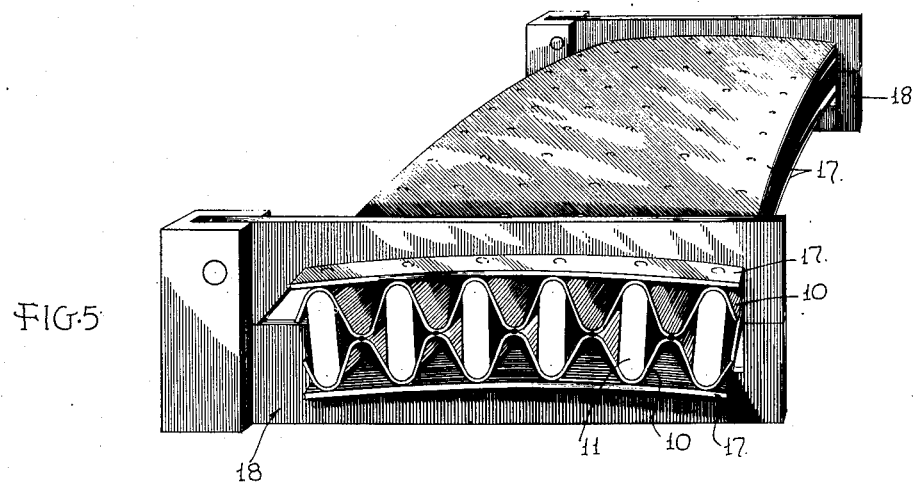
Fig. 5 shows the curved assembly in a welding jig.
Figure 6:
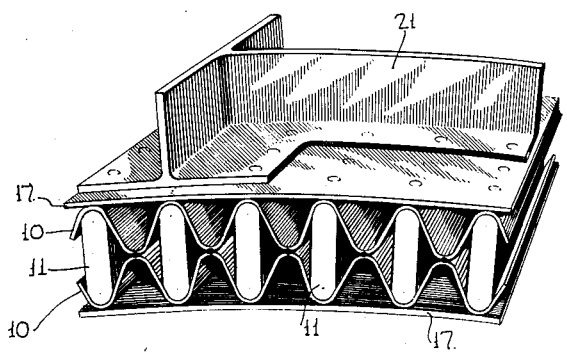

The entire assembly is clamped up in a jig fixture 18, as shown in Fig. 5, and the skin sheets are then welded to the core assembly with the mandrels still in place. Welds 19 are shown. The mandrels aid in locating the weld lines, in monitoring the position of parts in a welder by using the protruding ends, serve as electrode terminals if needed, and take the heat and pressure of welding. Doublers (Fig. 5), flanges 21 (Fig. 6) or other appurtenances may be welded while the mandrels are still present. Also, if desired the surfaces may be ground, planished, rolled or otherwise finished while the mandrels are still in place. This gives a size and finish of greater accuracy than has heretofore been attainable.

While the mandrels are still in position the finished panel units can be handled like a single skin sheet for securement to ribs, spars and the like, the only difference being that the mandrels must be left in accessible position for later removal.

After the mandrels have served all desired purposes they are usually found to be held fairly tightly in the assembly, particularly if the panel unit is of curved shape. However, it has been found that the mandrels can be removed quite readily by forcing them out as by a hammering action. The mandrels are left with projecting ends to which a hammer device may be clamped. The hammering now occurs within the tool where hardened impact surfaces can be provided and there is no injury to the mandrels. Air, steam or electric hammers of known type can be used.

The mandrels may be readily straightened after use and used over and over.

It is thus seen that the invention provides a very accurate, inexpensive and dependable method of making sandwich type panels and for assisting in incorporating the formed panels in a general structural assembly.

While one embodiment of the invention has been disclosed for purposes of illustration it is to be understood that there may be various embodiments and modifications within the general scope of the invention.

What is claimed is:

1. The method of fabricating a curved sandwich panel which includes mating corrugated core sheets and a smooth covering skin sheet on at least one side, which comprises, assembling two mating corrugated core sheets together with continuous solid conductor bar mandrels disposed between each pair of opposed spaced crests of the corrugations, resistance welding the core sheets together in the contacting valleys between crests and mandrels, keeping the mandrels in position and bending the composite core and mandrels together to a predetermined curved shape, placing a preshaped skin sheet on one side of the curved core and mandrel assembly, resistance welding the skin sheet to the crests of a curved core sheet with welding current passing through said mandrels, and thereafter removing the bent mandrels from the assembly.

2. The method of fabricating a curved sandwich panel which includes mating corrugated core sheets and a smooth core sheet on each side, which comprises, assembling two mating corrugated core sheets together with continuous solid conductor bar mandrels disposed between each pair of opposed spaced crests of the corrugations, holding the assembly in a jig, resistance welding the core sheets together in the contacting valleys between crests and mandrels, keeping the mandrels in position and bending the composite core and mandrels together to a predetermined curved shape, placing preshaped skin sheets on the sides of the curved core and mandrel assembly, resistance welding the skin sheets to the crests of the curved core sheet with the welding current passing through said mandrels, and thereafter removing the curved mandrels from the assembly.

References Cited in the file of this patent

UNITED STATES PATENTS

| | | |
|---|---|---|
| 1,042,885 | Budd et al. | Oct. 29, 1912 |
| 2,044,322 | Oliver et al. | June 16, 1936 |
| 2,163,590 | De Ganahl et al. | June 27, 1939 |
| 2,342,026 | Watter et al. | Feb. 15, 1944 |
| 2,610,078 | Risley et al. | Sept. 9, 1952 |
| 2,729,265 | Jones | Jan. 3, 1956 |
| 2,780,716 | Wasilisin et al. | Feb. 5, 1957 |

FOREIGN PATENTS

| | | |
|---|---|---|
| 274,369 | Great Britain | July 27, 1927 |